(12) United States Patent
Zhang et al.

(10) Patent No.: US 9,319,304 B2
(45) Date of Patent: Apr. 19, 2016

(54) METHOD OF ROUTING AND A DEVICE FOR AN AUTONOMOUS SYSTEM

(71) Applicant: HANGZHOU H3C TECHNOLOGIES CO., LTD., Zhejiang (CN)

(72) Inventors: Haifeng Zhang, Beijing (CN); Changwang Lin, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 524 days.

(21) Appl. No.: 13/708,749

(22) Filed: Dec. 7, 2012

(65) Prior Publication Data

US 2013/0148495 A1    Jun. 13, 2013

(30) Foreign Application Priority Data

Dec. 6, 2011  (CN) .......................... 2011 1 0406369

(51) Int. Cl.
  *H04L 12/24*   (2006.01)
  *H04L 12/707*  (2013.01)
  *H04L 12/703*  (2013.01)

(52) U.S. Cl.
  CPC ............... *H04L 45/22* (2013.01); *H04L 45/28* (2013.01)

(58) Field of Classification Search
  None
  See application file for complete search history.

(56) References Cited

U.S. PATENT DOCUMENTS

| 6,130,889 A | 10/2000 | Feldman et al. |
| 8,014,275 B1 | 9/2011 | Sundt et al. |
| 8,238,338 B2 | 8/2012 | Swallow et al. |
| 2009/0010153 A1* | 1/2009 | Filsfils et al. ................. 370/218 |
| 2009/0154340 A1* | 6/2009 | Kumaresan et al. .......... 370/218 |
| 2011/0080853 A1 | 4/2011 | Thubert et al. |
| 2012/0209581 A1 | 8/2012 | Gao et al. |

FOREIGN PATENT DOCUMENTS

| CN | 101036126 | 9/2007 |
| CN | 10237409 | 8/2008 |
| WO | WO-2009/038888 A1 | 3/2009 |

OTHER PUBLICATIONS

CN First Office Action dated Oct. 21, 2013 issued on CN Patent Application No. 201110406369.9 dated Dec. 9, 2011, The State Intellectual Property Office, P.R. China.

EP Extended Search Report dated Feb. 5, 2013 issued on EP Patent Application No. 12196050.4 filed on Dec. 7, 2012, European Patent Office.

(Continued)

*Primary Examiner* — Thai Nguyen

(74) *Attorney, Agent, or Firm* — Mannava & Kang, P.C.

(57) ABSTRACT

The disclosure relates to a method of routing for an Autonomous System AS in a communication system, in which the AS comprises a plurality of network devices including a first network device and a second network device. The first network device distributes routing information to a forwarding table by calculating a first route from the first network device to the second network device. The first network device receives information of a destination network device of the communication system from the second network device, and forms a second route from the second network device to the destination network device to be stored in the forwarding table using the received information of the destination network device. When the first route fails, the first network device calculates a third route from the first network device to the second network device and updates the routing information in the forwarding table according to the third route.

14 Claims, 5 Drawing Sheets

(56) References Cited

OTHER PUBLICATIONS

Moy, J; Ascend Communications / "OSPR Version 2" / Apr. 1, 1998, XP015008112, p. 118.

Yamada H et al, "End-to-End Performance Design Framework of MPLS Virtual Private Network Service across Autonomous System Boundaries", Telecommunications Network Strategy and Planning Symposium, IEEE, PI, Nov. 1, 2006, pp. 1-6.

Ensuring Rapid Restoration in Junos OS-Based Networks: A Complete Convergence Solution Based on Local Repair, Loop Free Alternates, and Hierarchical Forwarding; Juniper Networks; Mar. 2010. < http://www.juniper.net/us/en/locapdf/whitepapers/2000345-en.pdf >.

Pepelnjak, Ivan; Prefix-Independent Convergence (PIC): Fixing the Fib Bottleneck; Jan. 27, 2012. < http://blog.ioshints.info/2012/01/prefix-independent-convergence-pic.html >.

* cited by examiner

METHOD OF ROUTING AND A DEVICE FOR AN AUTONOMOUS SYSTEM

CLAIM FOR PRIORITY

The present application claims priority under 35 U.S.C 119 (a)-(d) to Chinese Patent application number 201110406369.9, filed on Dec. 9, 2011, the disclosure of which is incorporated by reference in its entirety.

BACKGROUND

An Autonomous System (AS) comprises a collection of network devices which share the same routing protocol to exchange routing information. A network device may for example be a router, a switch, or a computer, etc. The routing protocols uses within an AS are Interior Gateway Protocols (IGP). Mainstream IGPs include Open Shortest Path First (OSPF) protocol and Intermediate System to Intermediate System (ISIS) protocol. An AS may be divided into multiple areas. In an OSPF system, an Area Border Router (ABR) connects a backbone area of the AS to a non-backbone area, and an Autonomous System Border Router (ASBR) exchanges routing information with another AS. In an ISIS system, routers of the same level establish neighbour relationships. Further, Level-1-2 routers are capable of establishing neighbour relationships with Level-1 routers, Level-2 routers as well as Level-1-2 routers, and Level-2 routers may communicate directly with routers outside the AS.

BRIEF DESCRIPTION OF DRAWINGS

Examples of the present disclosure will be explained below with reference to the accompanying drawings, in which:

FIG. 2 is a flowchart of an example of a method of routing in an AS;

DETAILED DESCRIPTION

According to one example in accordance with the present disclosure, an AS comprises a plurality of network devices including a first network device and a second network device. The first network device distributes routing information to a forwarding table by calculating a first route from the first network device to the second network device. The first network device also receives information of a destination network device from the second network device, and forms a second route from the second network device to the destination network device to be stored in the forwarding table using the received information of the destination network device. When the first route fails, the first network device calculates a third route from the first network device to the second network device and updates the routing information in the forwarding table according to the third route.

As the route from the first network device to the destination network device is held in two segments (the first segment relating to the route from the first network device to the second network device and the second segment relating to the route from the second network device to the destination network device), upon failure of the first route, recovery or convergence may be achieved quickly by replacing the first route in the forwarding table with the third route.

Figure 1:
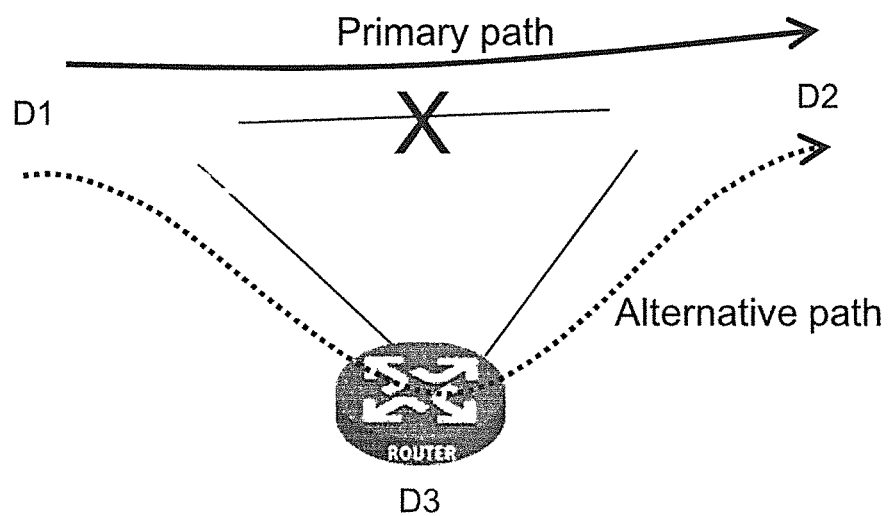
FIG. 1 is a schematic network diagram illustrating a path convergence operation.

To help explain the present disclosure, an example of a routing method used in an AS is first described using FIG. 1.

FIG. 1 schematically shows a part of an AS that comprises three network devices, D1, D2 and D3. The network devices D1, D2 and D3 may for example be routers. The AS may be an OSPF system, in which case devices D1 and D3 may be internal routers within an OSPF area, and device D2 may be an ABR of the area or an ASBR of the OSPF system.

In the example, there are two paths along which traffic may be forwarded from device D1 and D2—a primary path and an alternative path. Device D2 distributes routing information of all routes between itself and other network devices (not shown) within and external to the AS. The routing information may for example be a Type-3 LSA (Link State Advertisement) containing a Type-3 route, a Type-5 LSA containing a Type-5 route, or a Type-7 LSA containing a Type-7 route. For each piece of routing information received from device D2, for instance a Type-5 route for a respective network device, device D1 provides the received Type-5 route with routing information of a route between devices D1 and D2, and forms a route between device D1 and the network device that corresponds to the received Type-5 route. The routing information between devices D1 and D2 may for example be a next hop from device D1 and an outgoing interface. When the operational state of the primary path is normal, the next hop from device D1 is device D2 in the present example.

When the primary path from device D1 to device D2 fails, device D1 recalculates a route to device D2 as an alternative path. In the example, the next hop of the alternative path is device D3. Thereafter, for each of the received Type-5 routes, device D1 individually provides the received Type-5 route with the routing information of the newly calculated alternative path.

Figure 2:
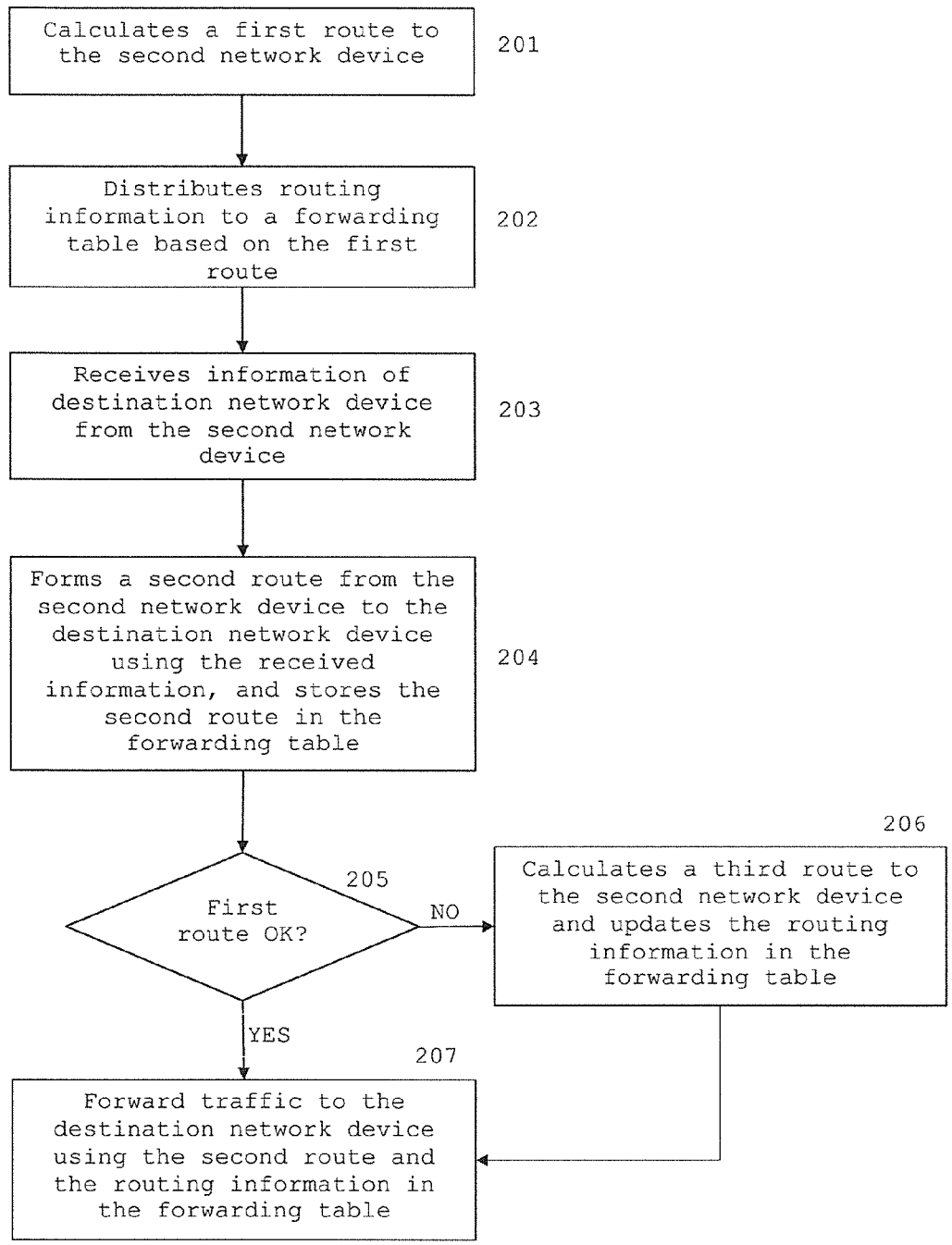

An example of a routing method for an AS is illustrated in the flow diagram of FIG. 2. In the present example, the AS comprises at least a first network device and a second network device. The AS may comprise more than two network devices. The AS may be an OSPF system, in which case the first network device may be an internal router and the second network device may be a border network device such as an ABR or an ASBR. The AS may be an ISIS system, in which case the first network device may be a Level-1 router and the second network device may be a Level 1-2 router.

At block 201, the first network device calculates a first route from itself to the second network device. This may for example be performed using a Shortest Path First (SPF) algorithm, or any other suitable algorithms. Then, at block 202, the first network device distributes routing information to a forwarding table based on the calculated first route. The forwarding table may be implemented as a software or hardware, as part of the first network device or external to the first network device. The routing information may include one or more of identification information of the second network device, next-hop information of a next-hop from the first network device, and outgoing interface information.

At block 203, the first network device receives information of a destination network device from the second network device. The destination network device may be another network device within the same AS or a network device external to the preset AS. The information of the destination network device may include routing information of a route between the second network device and the destination network device, such as a Type-3, Type-5 or Type-7 route for an OSPF system, or an ISIS route.

For the received information of the destination network device, at block 204, the first network device forms a second route that is a route from the second network device to the destination network device using the received information, and stores the second route in the forwarding table.

When it is determined at block 205 that the first route has become invalid, for example when a link in the first route is down, the first network device calculates a third route from itself to the second network device at block 206, and updates the routing information of a route between the first and second network devices in the forwarding table using the newly calculated second route.

When the first network device receives network traffic to be forwarded to the destination device, the first network device searches for the second route that is a route between the second network device and the destination network device in the forwarding table using the address of the destination network device, and using the found second route, the first network device searches for the routing information of a route between the first network device and the second network device. Then at block 207, the first network device forwards the traffic to the destination network device using the routing information of a route between the first network device and the second network device found in the forwarding table.

Figure 3:
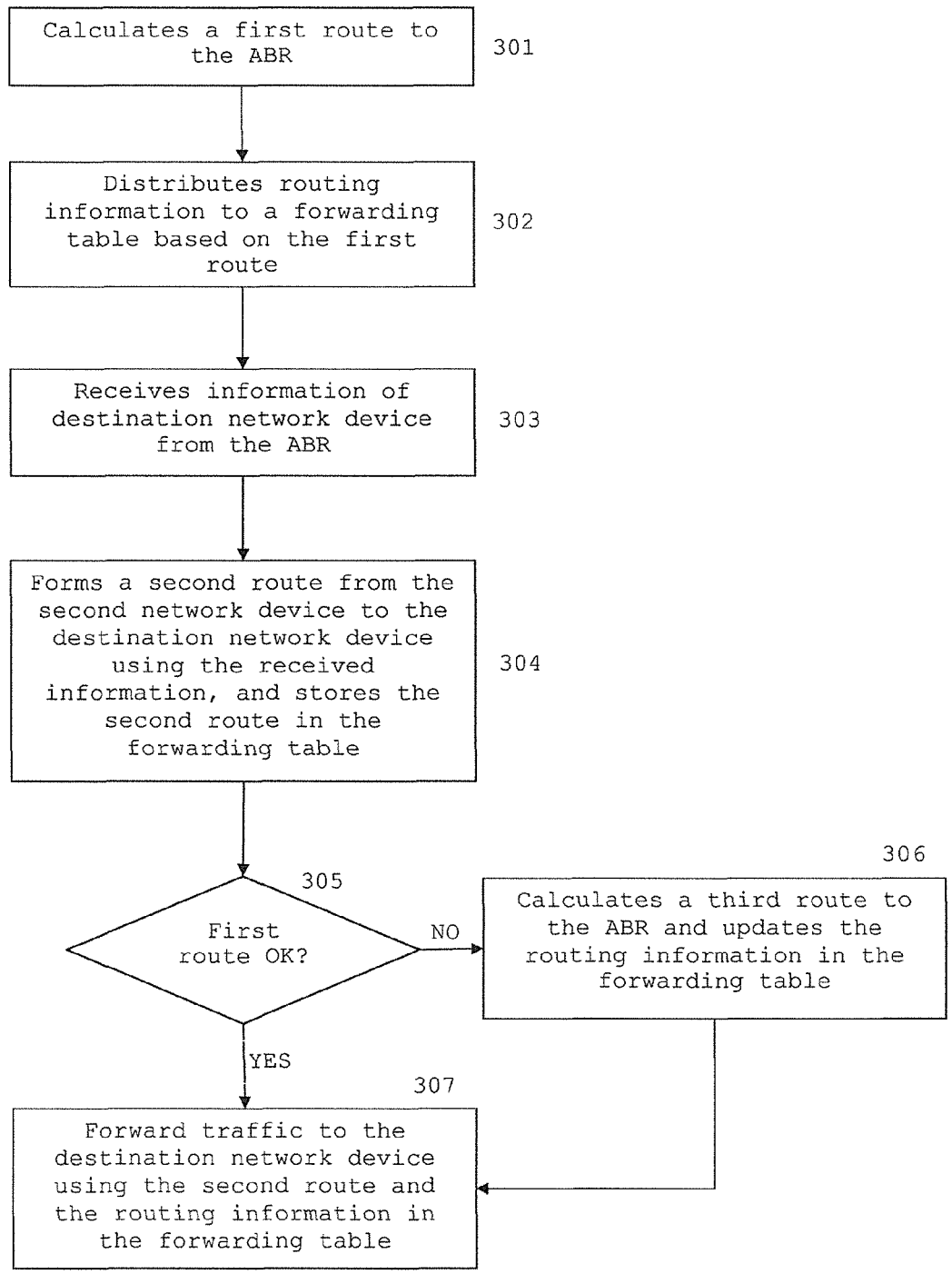
FIG. 3 is a flowchart of a method of routing in an OSPF area according to the example of FIG. 2.

In an example, the AS may be an OSPF system, and the second network device may be a border network device such as an ABR or an ASBR. FIG. 3 illustrates an implementation example in a case where the AS is an OSPF system and the second network device is an ABR. In the example, the information of the destination network device may be a Type-3 LSA containing a Type-3 route between the second network device and the destination network device.

At block 301, the first network device calculates a first route from itself to the ABR. Then, the first network device distributes routing information to a forwarding table at block 302 based on the calculated first route.

An OSPF network generally includes a backbone area and one or more non-backbone areas. The ABR is located at the intersection of one or more OSPF areas, and connecting these areas to the backbone area. The ABR may be regarded as a member of both the OSPF backbone area and the connected areas, and maintains a routing table that describes the topology of the backbone are and the topology of the other connected areas.

The routing information of a route between the first network device and the ABR may include identification information of the ABR, next-hop information and outgoing interface information, for instance, it may be in the form of (VRFindex processID, areaID, ABRID)→next-hop information, outgoing interface information. In this example, the identification information of the ABR may be (VRFindex processID, areaID, ABRID), where VRFIndex is a VPN (Virtual Private Network) Routing and Forwarding Instance Index, processID is an identifier of a process, areaID is an identifier of an area to which the ABR belongs, ABRID is an identifier of the ABR.

The ABR distributes information of one or more destination network devices belonging to the connected areas through the OSPF protocol. The information may be information from the routing table maintained by the ABR. The information may be Type-3 LSA containing a Type-3 route between the ABR and a respective destination network device. The information may include a prefix corresponding to the respective Type-3 route, next-hop information and outgoing interface information corresponding to the respective destination network device. A prefix for a Type-3 route may be the address of the destination network device and a mask corresponding to the address.

At block 303, the first network device receives the information, for example a Type-3 route, of the destination network devices from the ABR. For each received Type-3 route of a respective destination network device, the first network device forms a second route that is a route from the ABR to the respective destination network device at block 304 using the prefix, next-hop information and outgoing interface information of the Type-3 route, and stores the second route in the forwarding table.

When it is determined at block 305 that the first route has failed, the first network device calculates a third route that is an alternative route from itself to the ABR at block 306, and updates the routing information in the forwarding table using the newly calculated third route.

When the first network device receives network traffic to be forwarded to a given destination device, the first network device searches for the second route that is a route from the ABR to the destination network device in the forwarding table using the address of the destination network device, and using the found second route searches for the routing information for a route between itself and the ABR. Then, at block 307, the first network device forwards the traffic to the destination network device using the routing information thus found in the forwarding table.

In the present example, it can be seen that the forwarding table includes one route—the first (primary) route or the third (alternative) route—between the first network device and the ABR, and one or more Type-3 routes between the ABR and the respective one or more destination network devices. The routing information of the route between the first network device and the ABR may include the identification information of the ABR, and the next-hop information and the outgoing interface information corresponding to the first network device, for example, in the form of (VRFindex, processID, areaID, ABRID)→next-hop information, outgoing interface information. Each Type-3 route may include a prefix corresponding to the respective destination network device, and a next-hop and outgoing interface index, where the next-hop and outgoing interface index may be represented by the identification information of the ABR.

In the example, when the first network device is required to forward network traffic to a given destination network device, it first searches the plurality of second routes stored in the forwarding table for a Type-3 route prefix that corresponds, to the address of the destination network device. Then, according to the next-hop and outgoing interface index of the found Type-3 route, which is represented by the identification information of the ABR, the first network device searches in the forwarding table for the routing information of a route between itself and the ABR, and obtains the next-hop information and outgoing interface information corresponding to the route between the first network device and the ABR. When the present (primary) route between the first network device and the ABR fails, the first network device simply calculate an alternative route to the ABR and updates the routing information in the forwarding table based on the calculated alternative route. Thus, the routing information of a route between the first network device to the ABR is updated from the primary route to the alternative route. In this case, the updating only needs to be performed once for the route between the first network device and the ABR—it is not necessary to individually update each of the Type-3 routes stored in the forwarding table.

In another implementation example, the second network device may be an ASBR, in which case the information of the destination network device may be a Type-5 or Type-7 LSA respectively containing a Type-5 or a Type-7 route. In this case, the method of routing as illustrated in FIG. 3 may be implemented by replacing the ABR with an ASBR, and replacing the Type-3 route with a Type-5 or Type-7 route.

Figure 4:
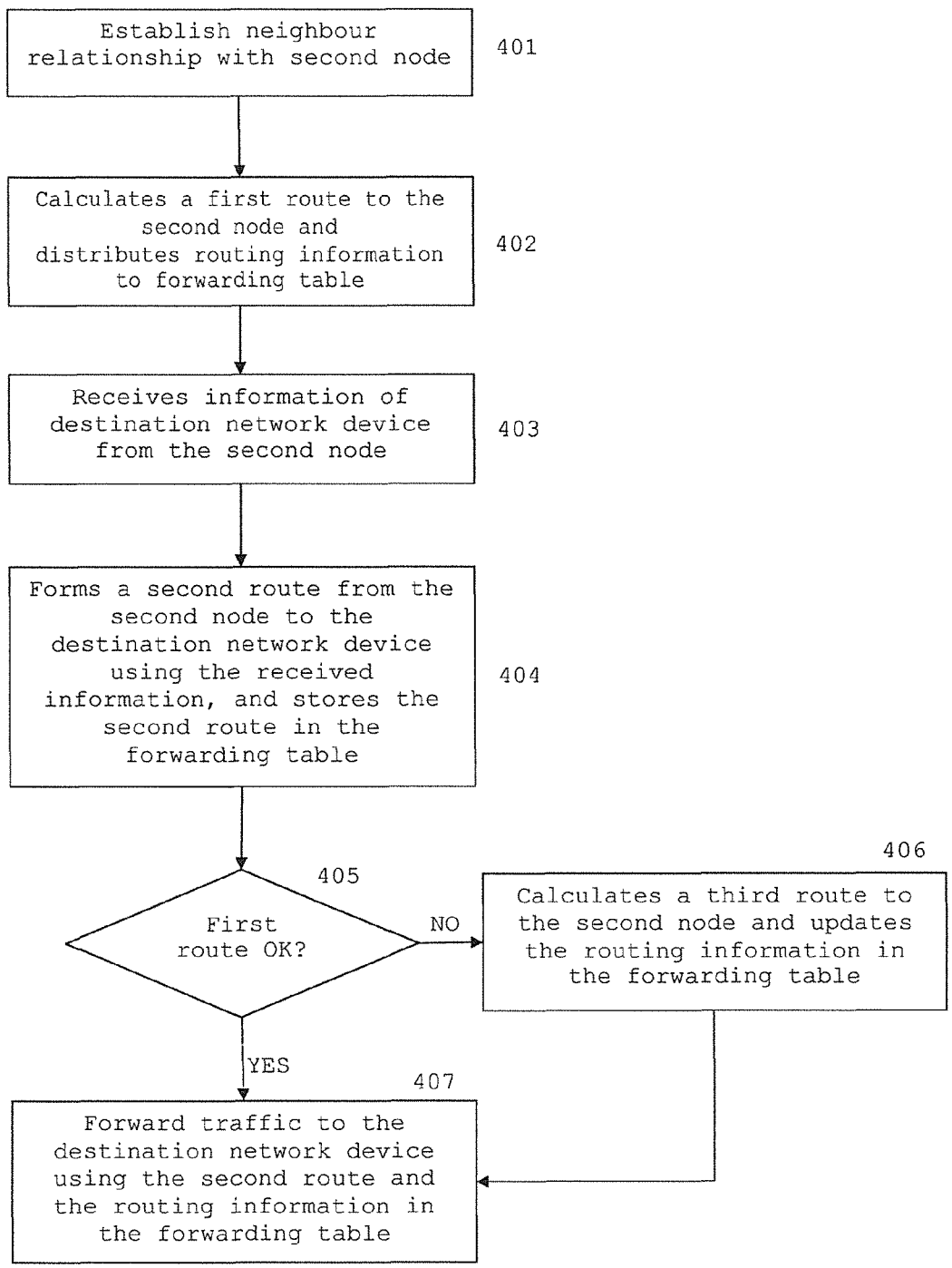
FIG. 4 is a flowchart of a method of routing in an ISIS system according to the example of FIG. 2.

In example, the AS may be an ISIS system, and the first and second network devices may be two network nodes of the same level within an ISIS area. FIG. 4 illustrates an implementation example in a case where the AS is an ISIS system and the first and second network devices are a first node and a second node. In the example, the information of the destination network device may be an ISIS route between the second node and the destination network device.

At block 401, the first node establishes a neighbour relationship with the second node.

At block 402, the first node calculates, for example using an SPF algorithm, a first route from itself to the second node. Then, the first node distributes routing information to a forwarding table based on the calculated first route. The routing information may include identification information of the second node, next-hop information and outgoing interface information, for instance in the form (VRFindex, processID, systemID)→next-hop information, outgoing interface information. In the example, systemID is an identifier of the second node.

The second node distributes information of one or more destination network devices belonging to the connected areas through the ISIS protocol. The information may be information from a routing table maintained by the second node. The information may be an ISIS route between the ABR and a respective destination network device. The information may include a prefix, next-hop information and outgoing interface information corresponding to the respective destination network device.

At block 403, the first node receives the information, for example a prefix, next-hop information and outgoing interface information of an ISIS route, of the destination network devices from the second node. In the example, a prefix may correspond to one or more source. For each received ISIS route having a single source prefix, the first node forms a second route that is a route from the second node to the respective destination network device at block 404 using the prefix, next-hop information and outgoing interface information of the ISIS route, and stores the second route in the forwarding table.

When it is determined at block 405 that the first route has failed, the first node calculates a third route that is an alternative route from itself to the second node at block 406, and updates the routing information in the forwarding table using the newly calculated third route.

When the first node receives network traffic to be forwarded to a given destination device, the first node searches for the second route that is a route from the second node to the destination network device in the forwarding table using the address of the destination network device, and using the found second route searches for the routing information for a route between itself and the second node. Then, at block 407, the first node forwards the traffic to the destination network device using the routing information thus found in the forwarding table.

Figure 5:
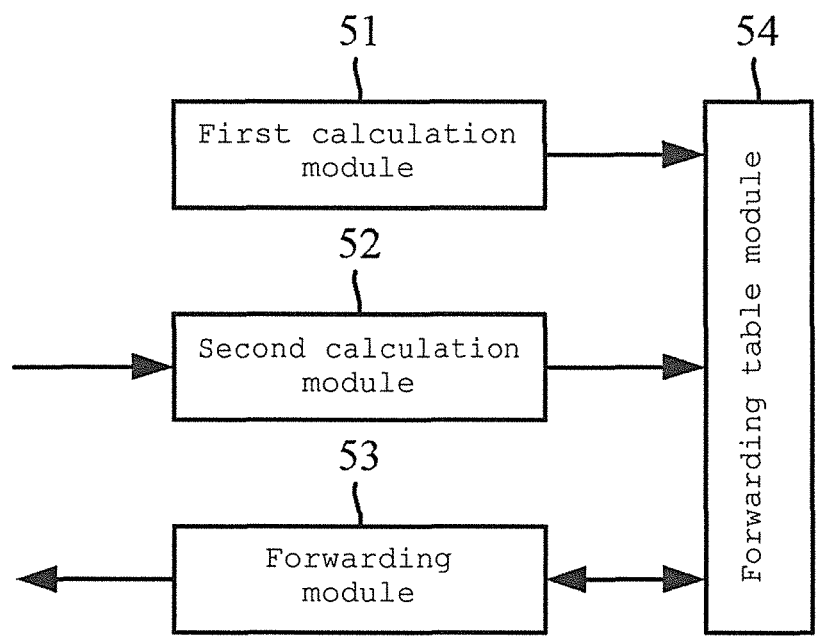
FIG. 5 is a schematic diagram of an example of a network device.

An example of a network device which may be used in an AS for implementing the method of routing as described in the examples above is shown schematically in FIG. 5. In the example, the AS comprises two or more network devices including the network device of FIG. 5. For example, the AS may have the same configuration as the AS in FIG. 1, where device D1 is replaced with the network device of FIG. 5. The network device may be used in an OSPF network for implementing the method of FIG. 3. The network device may also be used in an ISIS network for implementing the method of FIG. 4. The network device comprises a first calculation module 51 and a second calculation module 52.

Referring to both FIGS. 1 and 5, the first calculation module 51 is configured to calculate a first route, for example the primary path, from the network device to another network device of the AS, for example device D2, and to distribute routing information corresponding to the primary path to device D2 to a forwarding table. The forwarding table may be provided in a forwarding table module 54, which may be provided internally or externally to the network device. When the primary path fails, the first calculation module 51 is configured to calculate a third route, for example the alternative path, from the network device to device D2 and update the routing information in the forwarding table according to the newly calculated alternative path.

The second calculation module 52 is configured to receive information of a destination network device of the communication system from device D2, and to form a second route that is a route from device D2 to the destination network device to be stored in the forwarding table, by using the information of the destination network device received from device D2.

The routing information distributed to the forwarding table by the first calculation unit 51 may include identification information of the another network device, or device D2 in the example, and next-hop information and outgoing interface information that correspond to the route between the network device and device D2. The information of the destination network device received from device D2 may include a prefix, next-hop information and outgoing interface information that correspond to a route between the destination network device and device D2. The next-hop information and outgoing interface information of the destination network device may be represented by the identification information of device D2.

The network device may further comprise a forwarding module 53 configured to search for the second route that is a route between the destination network device and device D2 in the forwarding table, based on an address of the destination network device. Using the found second route, the forwarding module 53 is configured to search for the routing information of a route between the network device and device D2, and to forward network traffic to the destination network device according to the found routing information.

In an example where the AS is an OSPF system, the another network device, device D2, may be a border network device. Device D2 may be an Area Border Router (ABR) connected to at least two areas of the AS, the network device being a member of one of the connected areas, and the second calculation module 52 receives the information of the destination network device from the ABR as a Type-3 route in a Type-3 LSA. Device D2 may alternatively be an Autonomous System Border Router (ASBR) connected to another AS of the communication system, and the second calculation module 52 is configured to receive the information of the destination network device from the ASBR as a Type-5 route in a Type-5 LSA or a Type-7 route in a Type-7 LSA.

In an example where the network device is used in an OSPF network, the identification information of the another network device, device D2, may include a virtual private network routing forwarding instance VRF index, a process identifier, an area identifier and an identifier of the another network device.

According to the examples, the route from the network device to the destination network device is held in two segments (the first segment relating to the route from the network device to device D2 and the second segment relating to the route from device D2 to the destination network device), upon failure of the primary path, recovery or convergence may be achieved quickly by replacing the primary path in the forwarding table with the alternative path.

Although the flow diagrams described above show a specific order of execution, the order of execution may differ from that which is depicted.

The above examples can be implemented by hardware, software, firmware, or a combination thereof. For example, the various methods and functional modules described herein may be implemented by a processor (the term processor is to be interpreted broadly to include a CPU, processing unit, ASIC, logic unit, or programmable gate array etc.). The methods and functional modules may all be performed by a single processor or divided amongst several processors. The methods and functional modules may be implemented as machine readable instructions executable by one or more processors, hardware logic circuitry of the one or more processors, or a combination thereof. Further, the teachings herein may be implemented in the form of a software product, the computer software product being stored in a storage medium and comprising a plurality of instructions for making a computer device (e.g. a personal computer, a server or a network device such as a router, switch, access point etc.) implement the method recited in the examples of the present disclosure.

It should be understood that embodiments of the method of routing for an Autonomous System and embodiments of the network device above are implementation examples only, and do not limit the scope of the invention. Numerous other changes, substitutions, variations, alternations and modifications may be ascertained by those skilled in the art, and it is intended that the present disclosure encompass all such changes, substitutions, variations, alterations and modifications as falling within the spirit and scope of the appended claims.

What is claimed is:

1. A method of routing for an Autonomous System (AS) in a communication system, the AS comprising a plurality of network devices including a first network device and a second network device, the method comprising:
   the first network device:
   calculating a first route from the first network device to the second network device;
   sending routing information of the first route to a forwarding table in the AS;
   receiving information of a destination network device located outside of the AS from the second network device, and forming a second route from the second network device to the destination network device to be stored in the forwarding table using the received information of the destination network device, the received information of the destination network device including a prefix, next-hop information, and outgoing interface information corresponding to the destination network device, wherein the prefix includes an address of the destination network device;
   creating a correlation between the next-hop information and the outgoing interface information corresponding to the destination network device and identification information of the second network device, and storing the correlation in the forwarding table; and
   when the first route fails, calculating a third route from the first network device to the second network device and updating the routing information in the forwarding table according to the third route.

2. The method according to claim 1, wherein the first and second network devices utilize an Open Shortest Path First (OSPF) routing protocol, and the second network device is a border network device.

3. The method according to claim 1, wherein the first and second network devices utilize an Intermediate System-to-Intermediate System (ISIS) routing protocol, and the method further comprises the first network device establishing a neighbour relationship with the second network device.

4. The method according to claim 1, wherein the routing information includes the identification information of the second network device, and next-hop information and outgoing interface information corresponding to the first network device.

5. The method according to claim 1, further comprising, when forwarding traffic to the destination network device, the first network device searching for the second route in the forwarding table based on an address of the destination network device, searching for the routing information using the found second route, and forwarding the traffic to the destination network device according to the found routing information.

6. The method according to claim 2, wherein the border network device is an Area Border Router (ABR) connected to at least two areas of the AS, and the information of the destination network device that the first network device receives from the ABR is a Type-3 route;
   or, wherein the border network device is an Autonomous System Border Router (ASBR) connected to another AS of the communication system, and the information of the destination network device that the first network device receives from the ASBR is a Type-5 route or a Type-7 route.

7. The method according to claim 4, wherein, in a case where the first and second network devices utilize an OSPF routing protocol, the identification information of the second network device includes a virtual private network routing forwarding instance VRF index, a process identifier, an area identifier and an identifier of the second network device.

8. A network device for an Autonomous System (AS) in a communication system, the AS comprising a plurality of network devices including the network device, the network device comprising:
   a processor; and
   a non-transitory storage medium storing instructions that when executed by the processor cause the processor to:
   calculate a first route from the network device to another network device of the AS,
   send routing information corresponding to the first route to the another network device to a forwarding table,
   when the first route fails, calculate a third route from the network device to the another network device and update the routing information in the forwarding table according to the third route,
   receive information of a destination network device located outside of the AS from the another network device, and form a second route from the another network device to the destination network device to be stored in the forwarding table using the received information of the destination network device, the received information of the destination network device including a prefix, next-hop information, and outgoing interface information corresponding to the destination network device, wherein the prefix includes an address of the destination network device, and create a correlation between the next-hop information and the outgoing interface information corresponding to the destination network device and identification information of the second network device, and store the correlation in the forwarding table.

9. The network device according to claim 8, wherein the network device and the another network device utilize an Open Shortest Path First (OSPF) routing protocol, and the another network device is a border network device.

10. The network device according to claim 8, wherein the network device and the another network device utilize an Intermediate System-to-Intermediate System (ISIS) routing protocol.

11. The network device according to claim 8, wherein the routing information includes the identification information of the another network device, and next-hop information and outgoing interface information corresponding to the network device.

12. The network device according to claim 8, the instructions are further to cause the processor to search for the second route in the forwarding table based on an address of the destination network device, to search for the routing information using the found second route, and to forward traffic to the destination network device according to the found routing information.

13. The network device according to claim 9, wherein the border network device is an Area Border Router (ABR) connected to at least two areas of the AS, and the information of the destination network device from the ABR is a Type-3 route;

or, wherein the border network device is an Autonomous System Border Router (ASBR) connected to another AS of the communication system, and the information of the destination network device from the ASBR is a Type-5 route or a Type-7 route.

14. The network device according to claim 11, wherein, in a case where the network device and the another network device utilize an OSPF routing protocol, the identification information of the another network device includes a virtual private network routing forwarding instance VRF index, a process identifier, an area identifier and an identifier of the another network device.

\* \* \* \* \*